US006889202B2

(12) United States Patent
Johnson et al.

(10) Patent No.: US 6,889,202 B2
(45) Date of Patent: May 3, 2005

(54) INTERNET PRINT DEVICE FONT DISTRIBUTION METHOD AND WEB SITE

(75) Inventors: Steven C. Johnson, Eagle, ID (US); Shane R. Konsella, Boise, ID (US); Kwesi E. Abraham, Boise, ID (US); Arti Shukla, Eagle, ID (US); Jessop T. Dennis, Boise, ID (US); Michael L. Rishel, Star, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 259 days.

(21) Appl. No.: 09/815,647

(22) Filed: Mar. 23, 2001

(65) Prior Publication Data

US 2002/0136578 A1 Sep. 26, 2002

(51) Int. Cl.[7] .............................................. G06F 17/60
(52) U.S. Cl. ........................................ 705/26; 705/27
(58) Field of Search ..................................... 705/26, 27

(56) References Cited

U.S. PATENT DOCUMENTS

| | | | | |
|---|---|---|---|---|
| 5,533,174 A | * | 7/1996 | Flowers et al. | 358/1.15 |
| 6,073,147 A | * | 6/2000 | Chan et al. | 707/542 |
| 6,421,055 B1 | * | 7/2002 | Jones et al. | 345/471 |

FOREIGN PATENT DOCUMENTS

| | | | | |
|---|---|---|---|---|
| JP | 408329058 A | * | 12/1996 | G06F/17/21 |
| WO | WO-01/18681 A1 | * | 3/2001 | G06F/17/60 |
| WO | WO 01/18681 A2 | * | 3/2001 | G06F/17/60 |

OTHER PUBLICATIONS http://web.archive.org/web/*/www.font.net, Internet Archive Wayback Machine <Retrieved from Internet, Feb. 26, 2004>, Jan. 25, 1999.*
www.graphxedge.com [online] archived at www.archive.org [printed Mar. 23, 2003] (2 pages).*

* cited by examiner

*Primary Examiner*—Jeffrey A. Smith
*Assistant Examiner*—Matthew S Gart

(57) ABSTRACT

An Internet print device font distribution method and web site. Font users are visitors to a web site that allows browsing and obtaining of fonts, either individually or in groups. Preferably, purchases are made through the web site, but the method may allow installation of fonts through the web site as a result of other authorizations, e.g., an electronic coupon for visitors or a tie-in to other products, services, and web sites. Web site functions include operating system compatibility matching. The web site obtains configuration information to insure compatibility of a font to a visitor's configuration. Software on the web site downloads, installs and configures fonts on the visitor's print device.

27 Claims, 4 Drawing Sheets

INTERNET PRINT DEVICE FONT DISTRIBUTION METHOD AND WEB SITE

FIELD OF THE INVENTION

The present invention concerns print devices. Print device, as used herein, encompasses printers and other devices including a font based print function, e.g., multifunction peripherals. The invention is directed to a distribution method for print device fonts and a web site for print device font distribution.

BACKGROUND OF THE INVENTION

Print device fonts are important to users because a font is a primary component which defines the look of a document. A likely market exists to distribute print device fonts, but users, to a large extent, continue to rely upon fonts bundled with a print device when purchased and software generated fonts which are temporarily downloaded to a print device during a print job. The former situation restricts font choice, while the latter is inefficient. Studies show that print device-installed fonts improve performance by up to twenty percent compared to temporarily downloaded print device fonts. Performance gains are especially prominent in complicated character sets, such as Asian character sets.

Three conventional methods largely define the state of the art for print device-installed font distribution. Print device manufacturers include a set of fonts in the print device ROM. Once bundled, such fonts are fixed and may become obsolete as operating system fonts change. In addition, users are often compelled to accept a set of unwanted fonts as a package with a print device. Additional font packages come in the form of plug-in accessories, e.g., font cards. The plug-in accessory method of font distribution shares the same drawbacks as fixed ROM print fonts. Plug-in accessories also raise hardware compatibility issues and the distribution issues connected with a hardware product including, for example, slow distribution, prediction of demand, maintenance of inventories and installation support.

A third method of font distribution is generally referred to as a semi-permanent download. A user acquires fonts for the user's operating system. The user, using an external resource manager program, may then download selected fonts semi-permanently to storage on the print device independent of a particular print job. Once downloaded in this manner, the font appears to be permanent in that it remains available to multiple print jobs, but may be erased using the external resource manager. HP Resource Manager is an example of such a program. The fonts are loaded to a flash memory, a disk memory, RAM, or similar memory, and become available for use by subsequent print jobs. Installing the fonts is a complicated process, however, requiring an installer to convert the font from its native format into a print device specific format, download it to the print device, and configure the driver or other software on the operating system to use the newly installed font. The program which downloads to the print device may be incompatible with certain fonts and formats. The fonts may also be incompatible with certain print devices.

SUMMARY OF THE INVENTION

The invention is directed to an Internet print device font distribution method and web site. Font users are visitors to a web site which allows browsing and obtaining of fonts, either individually or in groups. Visitors access the web site via conventional connections with a client computer and software. Preferably, purchases are made through the web site, but the method may allow installation of fonts through the web site as a result of other authorizations, e.g., an electronic coupon for visitors or a tie-in to other products, services, and web sites. Web site functions include operating system compatibility matching. The web site obtains configuration information to insure compatibility of a font to a visitor's configuration. Software on the web site downloads, installs and configures fonts on the visitor's print device.

In a preferred embodiment, a web storefront is a web site advertising fonts for sale. The site permits viewing, selection and authorized installation of fonts from a set of print device-ready fonts. A preferred form of authorized installation includes a purchase through the web site. Fonts available on the web site are pre-tested and matched to print device models of common manufacturers and operating configurations to insure that each font has a defined set of workable installations. The site accesses, and may display, a database of configuration and performance information for multiple print device products. Visitors may be informed of potential estimated performance gains resulting from the installation of selected fonts. Information about the visitor's system configuration is obtained, e.g., operating system version, CPU type and speed, driver versions, print device models, and frequently used operating fonts. The site may obtain this information automatically by software which inspects the visitor system, it may obtain the information through having the visitor complete a form, or it may use a combination of manual and automatic information gathering. Automatic information gathering involves software that interacts with the client software/computer of a visitor to the web site. Purchased fonts are transferred to the visitor's system via interaction with the client software and computer. Software installs and configures the fonts onto the visitor's print device.

BRIEF DESCRIPTION OF THE DRAWINGS

Other features, objects and advantages of the invention will be apparent to those skilled in the art by reference to the detailed description and the drawings, of which.

DETAILED DESCRIPTION OF THE PREFERRED EMBODIMENTS

The invention provides a print device font distribution method in which fonts are distributed via the Internet. A novel business model for font distribution is thus provided, as well as a novel web site. The method and web site of the invention may be provided by or with the cooperation of a print device manufacturer or by an independent font provider. Fonts may be distributed by the invention as a replacement or a supplement to the conventional methods for print device font installations. Print device manufacturers might choose to provide fewer pre-installed fonts and rely upon custom distribution via distribution according to the invention. Distribution by the invention also may form a potential new e-commerce model for print device font sales, with fonts being selected, purchased, and installed via a web site.

Aspects of conventional web site and e-commerce technology, ranging from the web site interface itself to database software relied upon by the web site, will be useful in practical embodiments of the invention. Additional conventional software useful to implementation of the invention might include, for example, web site financial transaction software and customer database software. The following description accordingly focuses on the novel functions of the print device font distribution method and web site of the invention. Many practical embodiments of the invention making use of conventional web site software will be apparent to artisans in light of the following description.

Figure 1:
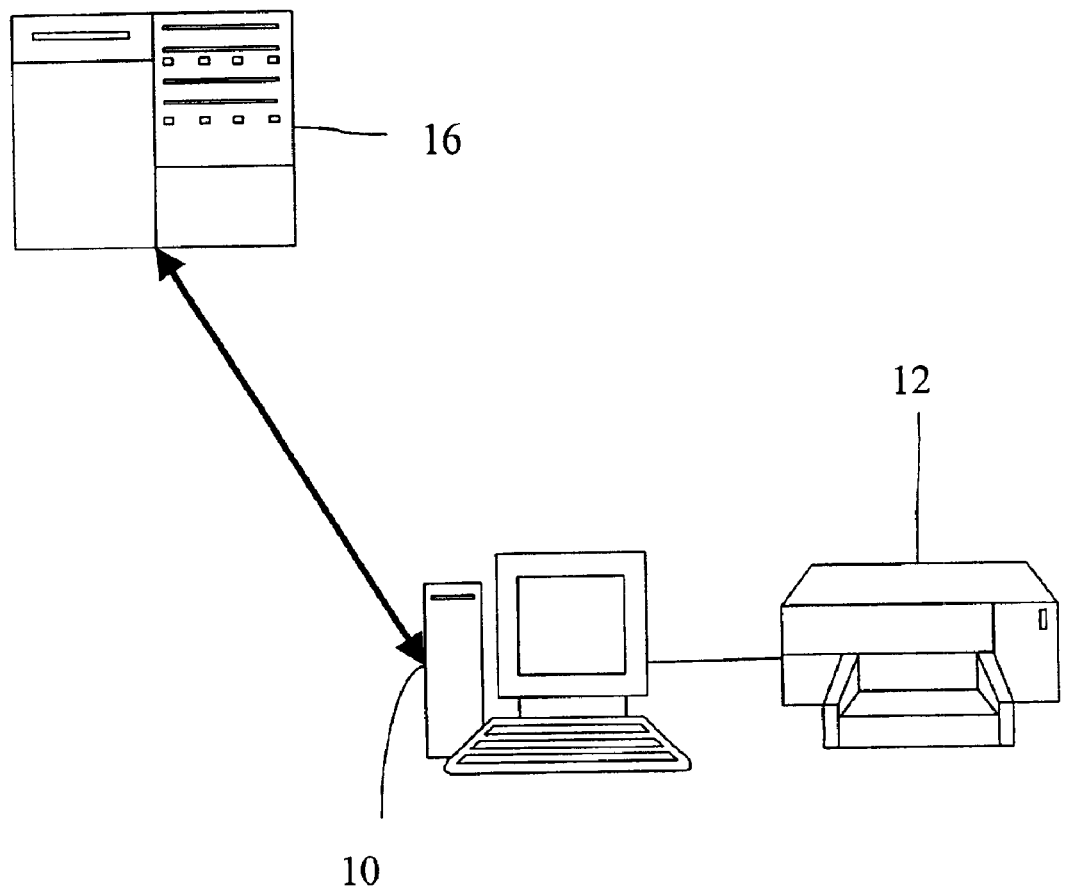
FIG. 1 is schematic representation of client-web host interactions conducted according to a font distribution and web site of the invention.

Referring now to FIG. 1, an exemplary computer system for implementation of the invention is shown. A client computer 10 includes, at least, a print application, a web browser, and a print device driver that controls print jobs to a print device 12. The client 10 and print device 12 might be stand-alone machines or part of a network with other computers and devices. Memory in the print device 12 typically includes a set of installed fonts available to a print application in the client computer 10. The web browser in the client computer 10 provides Internet access to a universe of web server computers, including a web host 16 configured according to the invention to implement a print device font distribution of the invention via a web site of the invention hosted by the web host 16. Connections made by the client computer 10 are generally represented in FIG. 1, and may include any form of networked or direct connection to the print device 12 and the web host 16.

Access to the print device font distribution web site hosted by the web host 16 may be initiated directly by a user of the client computer 10, automatically or semi-automatically as part of an initial installation or upgrade to the print device 12, or by software program in the client computer 10. The web site will guide and assist font selection and installation with an appropriate set of menus and graphical user interfaces. Such a web site is maintained to facilitate selection from a set of print device-ready fonts through the client computer 10.

Figure 2:
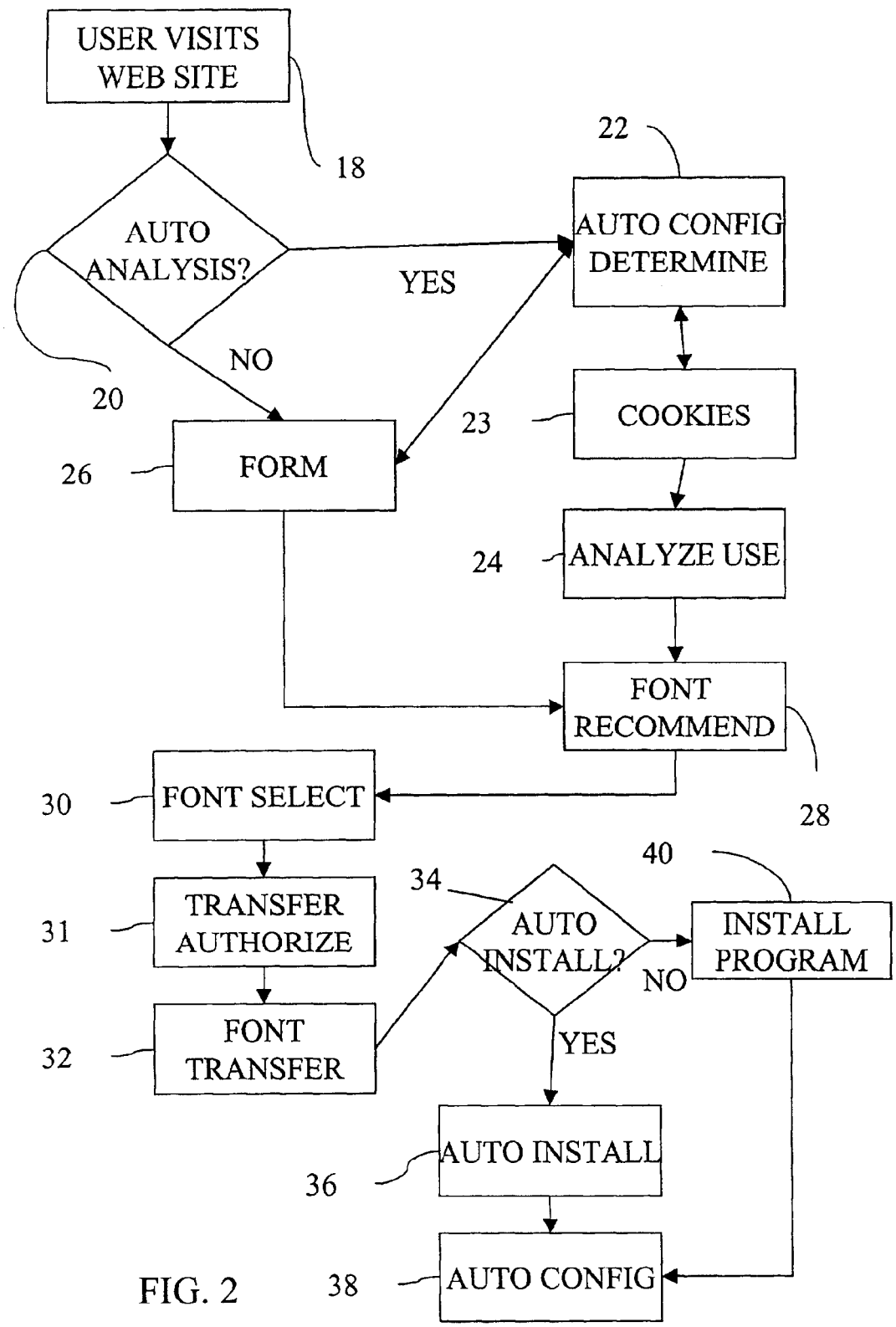
FIG. 2 illustrates a flow diagram for a preferred method of visitor interaction with a web site of the present invention.

Referring now to FIG. 2, a web site hosted by the web host 16 is visited 18 by a user of a client computer, and the user thereby becomes a visitor to the web site. This visit may be initiated by an number of actions which trigger a connection to access the web site via a web browser on the client computer 10 that addresses the web site on the web host 16. For example, but without being limited thereto, the web site might be accessed as part of a print device set-up program, in response to a link on another web site, in the flow of a print application in the client computer 10, or directly by a user of the client computer 10. Access to the web site might also be triggered by the print device 12 itself in response, for example, to a request for a print job using an unavailable font. Any such form of access to the web site is treated as a visit to the web site, with the possibility of a client computer or print device being treated as a visitor to the web site. Separate web sites, or a web site accessible through use of multiple URL addresses, might be maintained on the web host 16 and help determine how the web applications on the web host 16 will interact with the client-of a particular visitor to the web site.

Initial access to the web site might be responded to with none or any number of preliminary steps to confirm that a particular client computer or user of the same wishes to view, shop, install or purchase any number of fonts. Once the main web site on the client computer 10 is then entered, software on the web host 16 obtains information concerning the print device system configuration of the client 10 and print device 12 of a visitor. First, software determines 20 whether an automatic analysis of the system configuration is possible. If so, software automatically determines 22 the printing system configuration. The information obtained by the step of automatically determining the printing system information might include information such as the operating system type and version, print device driver type, print device brand, print device model, CPU type, CPU speed, print device driver versions, frequently used operating fonts and any other information useful in ensuring that a selected font may be properly installed and utilized by the printing system configuration of the particular client 10 and print device 12.

The automatic determining of step 22 might be realized by launching software which obtains said information concerning a visitor's system automatically. The software could be software which inspects the system including client 10 and print device 12. Cookies may also be utilized for repeat visits by a particular client, and the cookie could include some or all of the necessary information for the step of automatically determining. In such case the automatic determining of step 22 would first obtain 23 information from a cookie stored on the client 10. Using the obtained print system configuration information, another application on the web host 16 can then analyze 24 font usage by the particular client 10 and print device 12 for performance. Such analysis can reveal whether currently used fonts are detrimental to performance and whether performance gains might be realized by installation of an available font or fonts. Where an automatic analysis is not possible, the web site can display forms to be filled in by a visitor. The visitor fills in a form 26 including print system configuration information of the type obtained by the step 22 of automatically determining the print system configuration information. Some combination of the step 22 of a visitor filling in a form and the step 22 of automatically determining can also be used with, for example, part of the form displayed to the visitor being automatically filled in allowing the user to accept or correct any information when filling in the form in step 26. The automatic system configuration step analysis 22 may therefore interact with the form of step 26.

With information obtained by one or both of steps 22 and 26, software on the web host can then determine a set of fonts which may be selected to work based upon the print system configuration information. Preferably, software accesses a configuration database to determine an appropriate set of compatible fonts based upon the obtained information concerning a visitor's system configuration. Basic compatibility information can be used to recommend 28 fonts for transfer to the visitor. The recommended fonts are displayed in a suitable manner through the web browser on the client computer. Recommended fonts are chosen from an available set of print device ready fonts that are pre-tested and matched to print device models of common manufacturers and operating configurations. A more detailed recommendation might include potential performance gains that might be realized through the installation of available compatible fonts. To facilitate such a detailed recommendation, the configuration database may include configuration and performance data for multiple print device products and system configurations. Displayed recommendations can then include displaying potential estimated performance gains resulting from installation of a particular font.

A visitor is allowed to select only compatible fonts. The visitor selects fonts 30 for transfer. The web site then authorizes transfer 31 of a selected one or multiple ones of visitor selected fonts. Both the authorization and visitor selection may be realized in different ways. With respect to the visitor selection, selection may comprise human involvement in the context of an authorization that involves a sale of a print device font and the selection of fonts from a displayed menu, for example. As one alternative, visitor selection might be part of program run as part of a print device installation, driver installation, or upgrade, where the authorization might be a code or other indicia. Various forms of authorization and font selection with varying levels of human involvement can thus be used to achieve different models of font distribution ranging from new print device installations to direct purchase. In the purchase model of font distribution through the web site on the web host 16, the web site includes or links to a financial services interface and supporting software for handling electronic purchase transactions. In another model, an authorization code existing in an installed product, given as a promotion, or distributed in some other way produces an authorization for transfer. Yet another possible authorization scheme includes recognizing the visitor by some means, such as an examination of a coolie or recognition of a product serial number.

Once a transfer is authorized, selected authorized fonts are then transferred 32 from the web site and web host 16 to the visitor, for example the user client 10 of FIG. 1. An installation process from the web site is then initiated to install the authorized selected font or fonts on the visitor's print device 12. A check is made from web site software to determine 34 whether an automatic installation is possible. If such automatic installation is possible, the web site software then automatically installs 36 the font or fonts to the visitor's print device and automatically configures 38 the user's print system to use the newly installed fonts. Otherwise, the visitor will be prompted to run an install program 40 from the web site on the web host 16. Alternatively, the visitor can be prompted to run an install program from the visitor's client computer or the web host 16. Such interaction may be necessary, for example, if an automatic install is prevented by virus protection software. Another example involves display of a window requesting whether to trust content from the web host 16.

Figure 3:
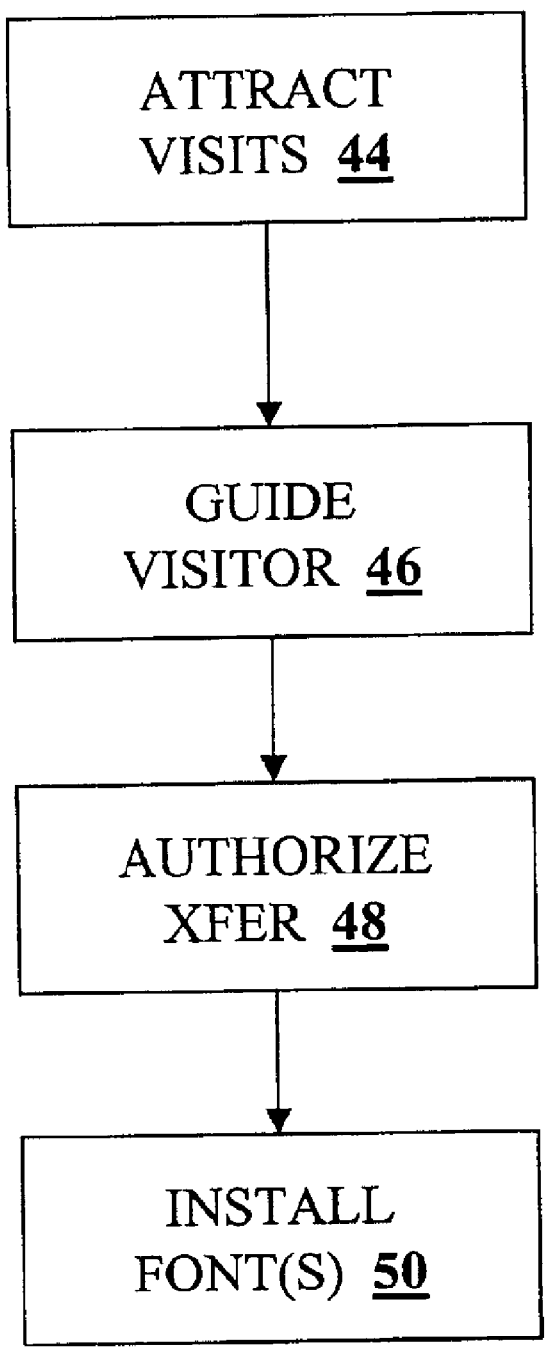
FIG. 3 illustrates a flow diagram from a preferred business method for the distribution of print device fonts through a web site according to the invention.

A particularly preferred font purchase business method of the invention uses features of the web site font distribution method of FIG. 2 to permit purchase of fonts, with the authorization of step 32 taking the form of a financial transaction such as a web based credit card transaction. Referring to FIG. 3, the font purchase business method of the invention attracts user visits 44 to a web site maintained for font purchase and distribution. The manner of attracting visitors could be varied. Common practices for advertising, linking, and otherwise directing visitors to the web site are acceptable. These practices might involve web-based techniques or might also utilize more traditional media, mailings, package inserts or other techniques to promote the web site.

In FIG. 3, a preferred method for visitors to shop, view and obtain fonts is illustrated. Once a visitor visits a web site of the invention, the visitor is guided 46 through the selection of one or multiple fonts compatible with the particular visitor's print system configuration. At an appropriate time, an authorization check 48, as discussed with respect to FIG. 2, is conducted. A preferred form of authorization is purchase through a financial services interface presented by the web site. Once payment or other authorization is obtained, the web site installs 50 an authorized font or set of fonts.

Figure 4:
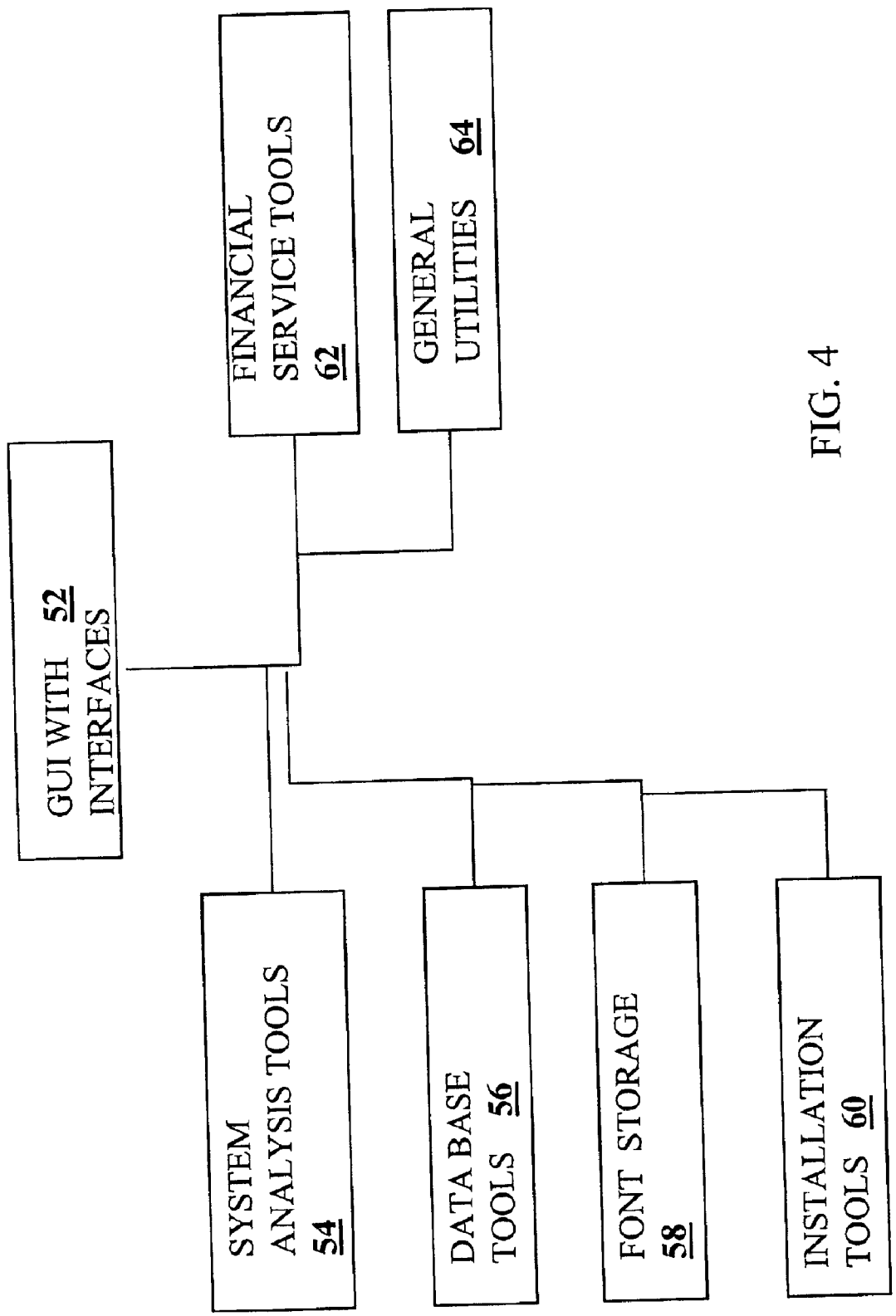
FIG. 4 is a schematic representation of software components for implementing a preferred web site of the invention.

A web site used by the invention, as generally referenced in FIG. 4, is realized by software preferably including a graphical interface 52 with the capability of generating relevant user interactive interfaces and menus. A set of system analysis tools 54 serves to facilitate analysis of a visitor's print system configuration to determine font compatibility and possibly performance. As discussed above, the analysis tools preferably operate automatically, when possible, and direct any necessary amount of web site visitor input through the graphical interface where complete automatic analysis is not possible. Database tools 56 include relational database structures containing information relevant to system and font analysis, including, for example, of confirmation information concerning font types, operating system type and version, print device driver type, print device brand, print device model, CPU type, CPU speed, print device driver versions, and print device models. Fonts for download and installation are stored in a font storage memory 58. The fonts in memory 58 should be pre-tested and matched to common models of print device manufacturers and operating configurations. Installation tools accomplish authorized downloads and installations of fonts from the font storage memory 58. Authorization, in a preferred embodiment, may come from financial services tools 62 which provides software to process secure payment for purchased fonts. In other cases, the financial services tools 62 might also provide software to process other forms of authorization, e.g., authorization codes and product upgrades based upon model and brand. General utilities 64 are any necessary or desirable conventional web site tools such as security tools and tools for linking to other web sites or hosts. The site may reserve some of the utilities for use by a system administrator while presenting others to visitors.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for distributing and installing print device fonts, the method comprising:

maintaining a web site which facilitates selection from a set of print device-ready fonts;

via the web site, obtaining information concerning a visitor's system configuration;

via the web site, receiving a request for a set of fonts for purchase;

via the web site, displaying potential estimated performance gains that may result from the purchase of a set of fonts other than the set of fonts requested by the visitor, wherein potential estimated performance gains comprise a characteristic of a print job executed with a print device installed font;

via the web site, permitting selection, by the visitor, from the set of fonts requested and the set of fonts other than the set of fonts requested;

via the web site, authorizing transfer of the set of fonts selected; and via the web site, installing the set of fonts selected on a print device corresponding to the visitor.

2. The method according to claim 1, wherein said web site comprises a web site with a graphical user interface and software to permit visitors to shop, view and purchase any one or more of said set of print device-ready fonts and said step of authorizing transfer comprises authorizing transfer after purchase of a selected one or multiple ones of said set of compatible fonts.

3. The method according to claim 2, wherein said software to permit purchase comprises a financial services interface and supporting software for handling electronic purchase transactions.

4. The method according to claim 1, wherein said set of print device ready fonts comprise pre-tested fonts matched to print device models of common manufacturers and operating configurations.

5. The method according to claim 1, further comprising accessing a configuration database to determine said set of compatible fonts based upon said information concerning a visitor's system configuration.

6. The method according to claim 1, wherein said configuration database includes configuration and performance data for one or more print device products.

7. The method according to claim 1, wherein said information concerning a visitor's system configuration includes one or more of an operating system version, CPU type, CPU speed, print device driver versions, print device models; and frequently used fonts.

8. The method according to claim 7, wherein obtaining said information concerning a visitor's system configuration comprises launching software which obtains said information concerning a visitor's system automatically.

9. The method according to claim 8, wherein said software which obtains said information comprises software which inspects the visitor system.

10. The method according to claim 7, wherein obtaining said information concerning a visitor's system configuration comprises receiving information through a form completed by a visitor.

11. The method according to claim 1, wherein obtaining said information concerning a visitor's system configuration comprises launching software which obtains said information concerning a visitor's system automatically.

12. The method according to claim 11, wherein said software which obtains said information comprises software which inspects the visitor system.

13. The method according to claim 1, wherein obtaining said information concerning a visitor's system configuration comprises receiving information through a form completed by a visitor.

14. The method according to claim 1, wherein installing comprises launching software which configures the fonts onto the visitor's print device.

15. The method of claim 1, further comprising determining whether fonts currently used by the visitor system are detrimental to performance of the visitor system.

16. The method of claim 1, wherein, in displaying potential estimated performance gains, at least one of an estimated increase in display resolution and printer resolution is displayed.

17. A method for distributing print device fonts, the method comprising:
receiving information corresponding to a visitor accessing a web site, the web site providing a selection of fonts for purchase by the visitor;
receiving information, via the web site, corresponding to the visitor designating one or more of the fonts for purchase;
determining a visitor's system configuration;
displaying potential estimated performance gains, based upon the visitor's system configuration, resulting from installation of one or more fonts other than the one or more of the fonts designated, wherein potential estimated performance gains comprise a characteristic of a print job;
receiving information corresponding to the visitor selecting for purchase one or more of the fonts designated or one or more of the fonts other than the fonts designated; and
from the web site, in response to a purchase by the visitor, installing said selected one or more of the fonts on a print device of the visitor.

18. The method of claim 17, further comprising determining whether fonts currently used by the visitor system are detrimental to performance of the visitor system.

19. The method of claim 17, wherein, in displaying potential estimated performance gains, at least one of an estimated increase in display resolution and printer resolution is displayed.

20. A system configured to operate a web site for distributing print device fonts, the web site being accessible over the Internet, the system, comprising:
a processor; and
a memory coupled to the processor, the memory having stored therein an executable instruction set, the instruction set, when executed by the processor, directs the processor to perform a method comprising:
permitting a visitor to select fonts compatible with that visitor's system configuration for purchase from the web-site;
displaying potential estimated performance gains which may result from installation of a font not among the select fonts previously selected by the visitor, wherein potential estimated performance gains comprise a characteristic of a print job;
determining whether to authorize installation of a selected one or selected multiple compatible fonts; and
installing said selected one or selected multiple compatible fonts on a visitor's print device in response to the logic configured to determine.

21. The system according to claim 20, the web site further comprising:
obtaining configuration information from a visitor's system;
comparing obtained configuration information to a database including configuration and performance data for multiple print device products; and
determining a set of fonts compatible with the system configuration of the visitor.

22. The system according to claim 20, the web site further comprising:
requesting and processing visitor payment for a selected one or selected multiple compatible fonts.

23. The system according to claim 20, the web site further comprising:
displaying graphical interfaces to guide a visitor through selecting one or multiple compatible fonts.

24. The system according to claim 20, the web site further comprising:
displaying fonts compatible with the visitor's system configuration.

25. The system according to claim 20, the web site further comprising:
displaying a selected one or selected multiple compatible fonts.

26. The system according to claim 20, the web site further comprising:
   determining whether fonts currently used by the visitor system are detrimental to performance of the visitor system.

27. The system according to claim 20, wherein at least one of an estimated increase in display resolution and printer resolution is displayed.

* * * * *